-146,54 [illegible] 142 [illegible]
11-75 [illegible] [illegible]

Feb. 11, 1975 H. M. HASKEW ET AL Re. 28,333

DISTRIBUTOR DRIVE ARRANGEMENT

Original Filed April 13, 1970

United States Patent

Re. 28,333
Reissued Feb. 11, 1975

28,333

DISTRIBUTOR DRIVE ARRANGEMENT

Harold M. Haskew, Milford and David A. Martens, Washington, Mich., assignors to General Motors Corporation, Detroit, Mich.

Original No. 3,662,726, dated May 16, 1972, Ser. No. 27,675, Apr. 13, 1970. Application for reissue May 14, 1973, Ser. No. 359,975

Int. Cl. F02p 7/00

U.S. Cl. 123—146.5 A 2 Claims

Matter enclosed in heavy brackets [ ] appears in the original patent but forms no part of this reissue specification; matter printed in italics indicates the additions made by reissue.

ABSTRACT OF THE DISCLOSURE

A distributor drive arrangement to prevent spark scatter in which the distributor drive shaft is journaled at one end in a bushing to which oil under pressure is supplied to load the drive shaft in one direction, the oil leaking between the bearing surfaces of the bushing and the shaft so that as the shaft rotates, viscous shearing of the oil will provide a controlled drag on the rotating drive shaft.

This invention relates to a distributor drive arrangement and, in particular, to a distributor drive arrangement for an internal combustion engine.

In a conventional internal combustion engine, the distributor drive shaft, having a helical gear thereon, is driven by a helical gear attached to the engine crankshaft. It has now been found that when this prior art distributor arrangement is used on certain types of engines, torsional vibration of the drive shaft will occur to produce spark scatter, that is, to produce fluctuations in the timing of the spark during variations in engine speed. In effect, this torsional vibration is caused by backlash between the helical gears and by the fact that the distributor drive shaft is freely rotatable, with the only major resistance to free rotation occurring when the cam of the distributor engages the contact arm causing the contacts to open and close.

Accordingly, it is the primary object of this invention to improve a distributor drive arrangement whereby spark scatter is eliminated by elimination of torsional vibration in the distributor drive shaft.

Another object of this invention is to improve a distributor drive arrangement whereby the distributor drive shaft is journaled in a hydraulic viscous drag bushing to thereby eliminate torsional vibration of the distributor drive shaft during operation.

These and other objects of the invention are obtained by means of a distributor drive arrangement for an internal combustion engine in which the distributor is mounted on a distributor drive *support* casing with one end of the distributor drive shaft journaled in a bushing provided in the casing, the bushing being arranged so that oil supplied thereto under pressure acts on the end of the distributor drive shaft to bias the driven helical gear thereon into continued contact with a drive helical gear on [the cam] *a* shaft of the engine, the clearance between the bearing surfaces of the bushing and a distributor drive shaft being such that as the drive shaft rotates, viscous shearing of the oil between these bearing surfaces will provide a controlled drag on the rotating distributor drive shaft.

For a better understanding of the invention, as well as other objects and further features thereof, reference is had to the following detailed description of the invention to be read in connection with the accompanying drawings, wherein.

Figure 1:
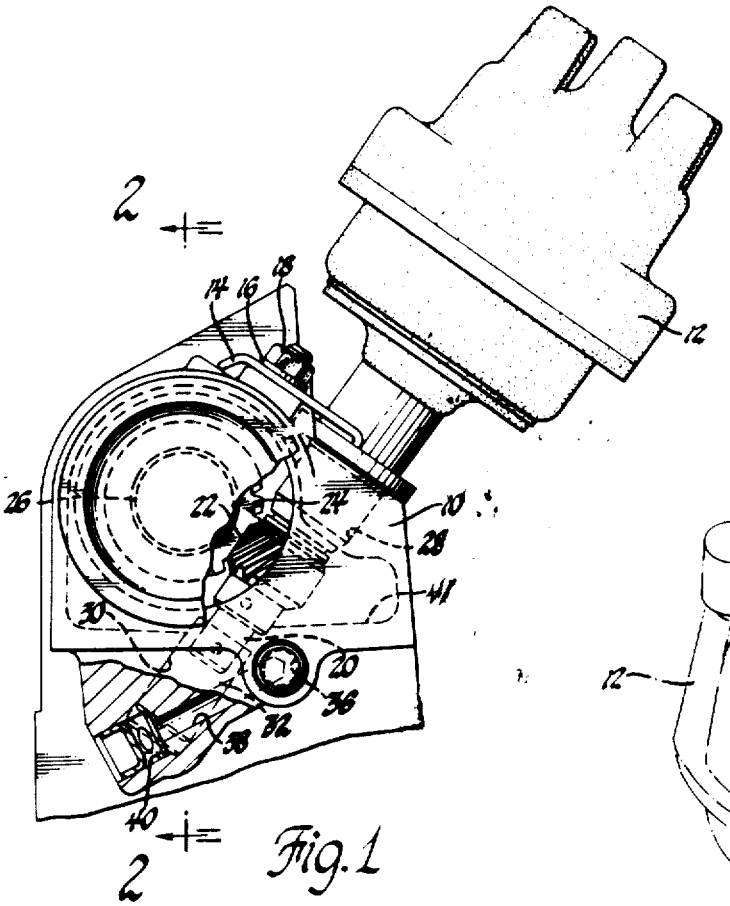
FIG. 1 is an elevational view of a portion of an internal combustion engine having a distributor drive arrangement in accordance with the invention.
Figure 2:
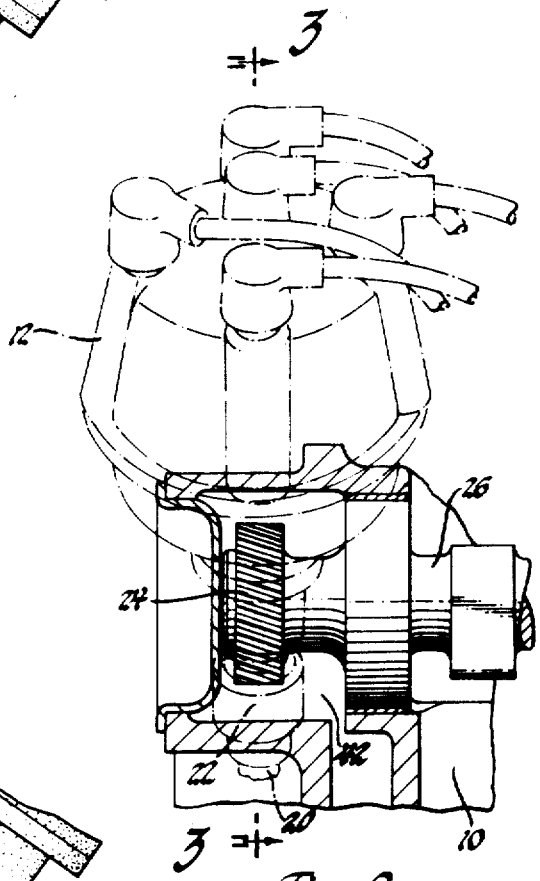
FIG. 2 is a sectional view taken along line 2—2 of FIG. 1.

Referring now to the drawings, there is shown a portion of [a] *an engine housing, such as the* cylinder head 10 of an internal combustion engine to which a distributor 12 is removably secured as by a clamp 14, retainer 16 and nut 18 arrangement. The distributor drive shaft 20, suitably journaled in a conventional manner, not shown, at its upper end in the housing of the distributor, is driven by a distributor drive gear 22 in meshing engagement with a helical gear 24 on *a shaft of the engine, such as* the cam shaft 26 of the engine.

In order to eliminate any possible torsional vibration of the distributor shaft during engine operation and thereby control spark scatter, the [cylinder head] *housing* is provided, concentric with the upper bore 28 therein housing the base of the distributor, with a bored bushing 30 adapted to rotatably receive the lower enlarged end of the distributor drive shaft, which could be formed integral with the distributor shaft 20 or, as shown, is formed as a separate shaft extension 32 secured as by a spiral pin 34 to the lower end of the distributor drive shaft 20.

Figure 3:
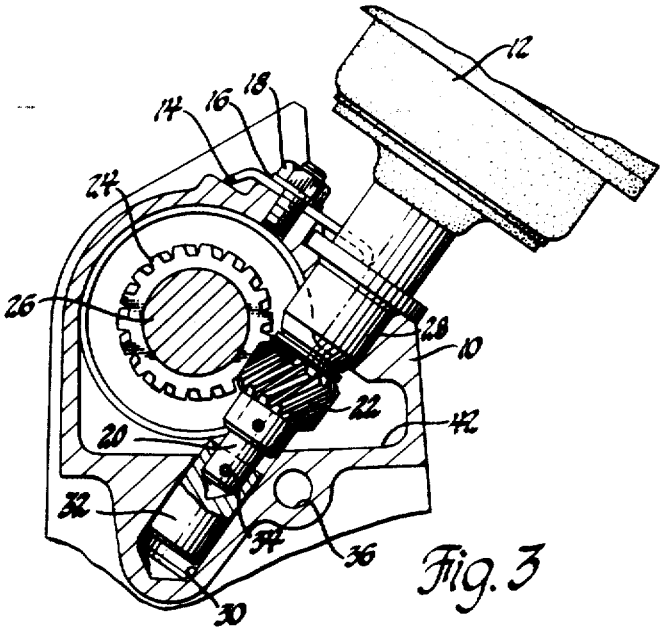
FIG. 3 is a sectional view taken along line 3—3 of FIG. 2.

In operation, oil under pressure, as, for example, from 20 pounds per square inch to 50 pounds per square inch, from the oil gallery 36 in the [cylinder head] *housing* is fed by a connecting conduit 38 and bored conduit 40 to the bottom of the bushing, as seen in FIGS. 1 and 3, the oil acting on the bottom end of the shaft extension 32 to load the distributor shaft upward to take up any axial clearance of the shaft and any clearance between the distributor drive gear 22 and the helical gear 24 on the [cam] shaft *26* to prevent blacklash between these gears.

In addition, during operation, oil will leak from the bottom of the bushing 30 between the outer peripheral surface of shaft extension 32 and the bearing surface of the bushing and into the chamber 42 in the [cylinder head] *housing* from where it will drain through a suitable drain passage, not shown, therein. The clearance between the outer peripheral surface of the shaft extension 32 and the bearing surface of bushing 30 is preselected so that as the shaft extension rotates in the bushing, there will be viscous shearing of the thin film of oil between these surfaces to provide a viscous drag on the distributor shaft to limit torsional vibration of this shaft as the contact in the distributor is repeatedly opened and closed during engine operation. For example, in the embodiment of the distributor drive arrangement illustrated, the shaft extension 32 is approximately three-quarters of an inch in diameter and a clearance of one and one-half thousandths of an inch to five thousandths of an inch is provided between shaft extension 32 and the bearing surface of bushing 30 so that the desired viscous shearing of the oil film therebetween is obtained, due consideration having been made to provide a suitable journaled length for the shaft extension 32 in the bushing 30.

What is claimed is:

1. A distributor drive arrangement for an internal combustion engine having a [cam] shaft journaled in the [cylinder head] *housing* of the engine provided with a gear thereon, and a distributor having a journaled drive shaft with a gear thereon extending from one end thereof and positioned on the [cylinder block] *housing* with the gear on the drive shaft in mesh with the gear on the [cam] shaft, said distributor drive arrangement including bushing means in said [cylinder head] *housing* located concentric with said drive shaft, said bushing means having a partly closed end, said drive shaft having an extension shaft portion journaled in said bushing means, said extension shaft portion extending into said bushing to a position at which its free end is closely adjacent said partly closed end whereby said bushing means serves as a cylinder and said extension shaft portion serves as a piston therein, and passage means in said [cylinder head] *housing* in communication with said bushing means and adapted to be connected to a source of oil under pressure, said passage means opening into said bushing adjacent said partly closed end whereby said drive shaft is hydraulically loaded in one direction by oil under pressure acting on said free end of said extension shaft portion, the clearance between the inside diameter of said bushing means and the outer peripheral surface of said extension shaft portion being such that upon rotation of said extension shaft portion in said bushing means viscous shearing of oil will occur to provide a viscous drag on said drive shaft.

2. In an internal combustion engine having a [cam] shaft journaled in the [cylinder head] *housing* of the engine and the distributor drive shaft of a distributor connected with and driven by gear means on the [cam] shaft and on the distributor drive shaft, the improvement comprising bushing means in the [cylinder head] *housing* concentric with the distributor drive shaft and spaced therefrom, said bushing means being partly closed at one end, a shaft extension secured at one end to the distributor drive shaft for rotation therewith and journaled in said bushing means with its opposite end spaced from said partly closed one end of said bushing means, and passage means in said [cylinder head] *housing* in communication with said bushing means at said partly closed one end to supply oil under pressure to said bushing means against said opposite end of said shaft extension and between the inside diameter of said bushing means and the outside peripheral surface of said shaft extension journaled therein to hydraulically load said shaft extension in one direction and to provide a viscous drag on said shaft extension.

References Cited

The following references, cited by the Examiner, are of record in the patented file of this patent or the original patent.

UNITED STATES PATENTS

| | | | |
|---|---|---|---|
| 1,397,941 | 11/1921 | Wright | 123—146.5 |
| 1,569,205 | 1/1926 | Sandin | 123—146.5 |
| 2,238,649 | 4/1941 | Kishline | 123—146.5 |

LAURENCE M. GOODRIDGE, Primary Examiner

C. FLINT, Assistant Examiner